G. G. BUCHANAN.
Churns.
No. 144,437.  Patented Nov. 11, 1873.
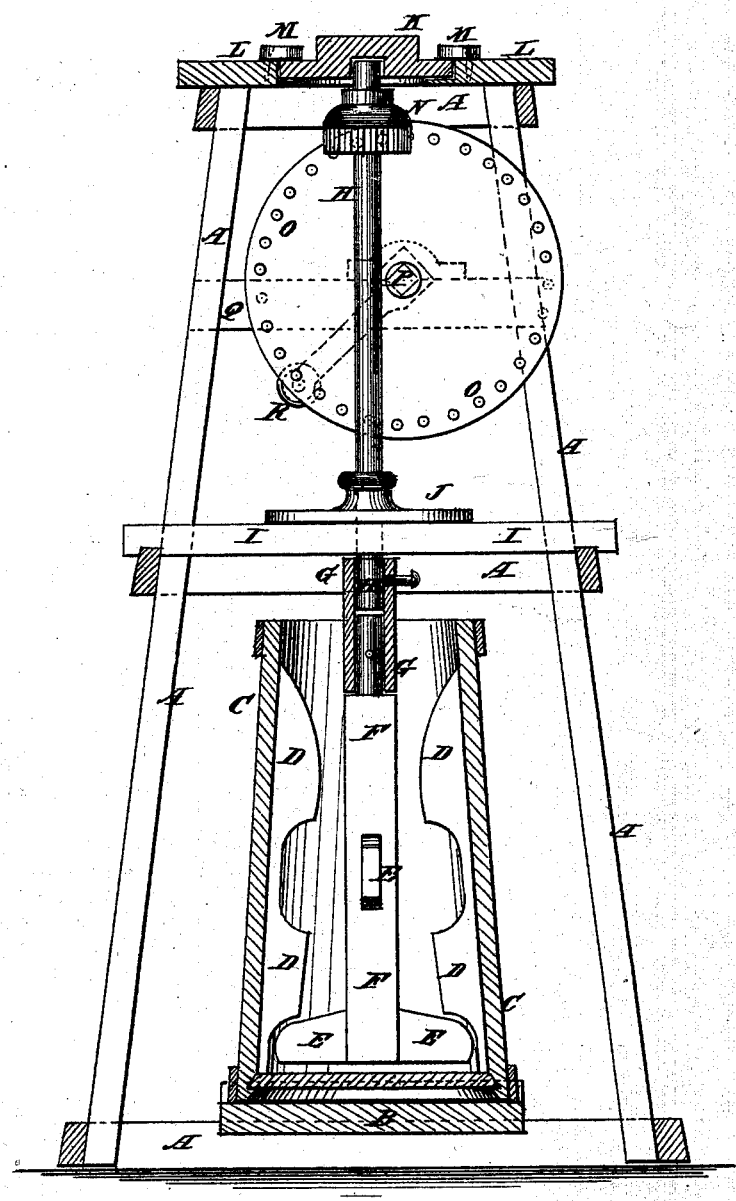
Witnesses:
P. C. Dietrich
Sedgwick
Inventor:
G. G. Buchanan
Per  [Attorney signature]
Attorneys.

UNITED STATES PATENT OFFICE.

GEORGE G. BUCHANAN, OF COTTON PLANT, MISSISSIPPI.

IMPROVEMENT IN CHURNS.

Specification forming part of Letters Patent No. 144,437, dated November 11, 1873; application filed June 14, 1873.

*To all whom it may concern:*

Be it known that I, GEORGE G. BUCHANAN, of Cotton Plant, in the county of Union and State of Mississippi, have invented a new and useful Improvement in Churning Apparatus, of which the following is a specification:

The figure is a vertical section of my improved churning apparatus.

My invention has for its object to furnish an improved churning apparatus, simple in construction, convenient in use, and effective in operation, bringing and gathering the butter very quickly and thoroughly.

The invention will first be fully described in connection with all that is necessary to a full understanding thereof, and then clearly pointed out in the claim.

A represents the frame of the machine. To the base-bars of the frame A is secured the platform B, upon which the churn-body C stands, and where it is secured in place by cleats attached to said platform. To the inner surface of the churn-body C are attached two or more vertical ribs or plates, D, in the lower and middle parts of which are formed recesses to receive the projections, arms, or paddles E formed upon or attached to the lower and middle parts of the dasher-shaft F. By this construction, as the dasher-shaft F is revolved the projections E form currents in the milk, which strike against the plates or ribs D, and the milk is thrown into violent agitation, bringing the butter in a very short time. The upper end of the dasher-shaft F is fitted into and secured to the lower end of a short metallic tube or sleeve, G, into the upper end of which is fitted, and detachably secured by a set-screw or pin, the lower end of the metallic shaft H, which revolves in bearings in the cross-bar I, attached to the middle horizontal bars of the frame A. The shaft H is supported by a collar, J, attached to or formed upon it, and which rests upon the upper side of the bar I. The upper end of the shaft H revolves in bearings K, inserted in a recess in the platform L, attached to the top of the frame A, and where it is detachably secured in place by buttons M. The recess in the platform L is made of such a size that the small gear-wheel N, attached to the upper part of the shaft H, may pass through it for convenience in detaching the dasher-shaft F in removing the churn. O is a large gear-wheel, the teeth of which mesh into the teeth of the small gear-wheel N. The gear-wheel O is attached to the inner end of the horizontal shaft P, which revolves in bearings attached to a cross-bar, Q, secured to the frame A, and to its outer end is secured the crank R, by means of which the apparatus is operated.

Having thus described my invention, I claim as new and desire to secure by Letters Patent—

A churn-dasher section, H, having a pinion, N, by which it may be rotated, and a flange, J, by which it may be supported, connected detachably with tube G, and with a detachable cap, K, as described, to allow it to be easily removed.

G. G. BUCHANAN.

Witnesses:
J. J. DAVIS,
A. H. MCALLISTER.